United States Patent
Noonan

(10) Patent No.: US 7,493,336 B2
(45) Date of Patent: Feb. 17, 2009

(54) SYSTEM AND METHOD OF UPDATING PLANOGRAM INFORMATION USING RFID TAGS AND PERSONAL SHOPPING DEVICE

(75) Inventor: William Noonan, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1241 days.

(21) Appl. No.: 10/624,322

(22) Filed: Jul. 22, 2003

(65) Prior Publication Data

US 2005/0021561 A1 Jan. 27, 2005

(51) Int. Cl.
G06F 17/30 (2006.01)
G06F 7/00 (2006.01)
(52) U.S. Cl. .................... 707/104.1; 235/383; 235/385; 705/22; 705/28; 707/102
(58) Field of Classification Search ............. 705/20–29; 707/104.1
See application file for complete search history.

(56) References Cited

U.S. PATENT DOCUMENTS 6,550,674 B1 * 4/2003 Neumark .................... 235/383

2002/0008621 A1 1/2002 Barritz et al.
2002/0038267 A1 3/2002 Crovitz et al.
2002/0174025 A1 * 11/2002 Hind et al. ..................... 705/26
2002/0178013 A1 * 11/2002 Hoffman et al. ............... 705/1

FOREIGN PATENT DOCUMENTS

GB 2375407 A 11/2002
GB 2375407 A * 11/2002

* cited by examiner

Primary Examiner—Tim T Vo
Assistant Examiner—Sangwoo Ahn
(74) Attorney, Agent, or Firm—Duke W. Yee; Mark E. McBurney; Rakesh Garg

(57) ABSTRACT

A method and system for updating and verifying the accuracy of a retailer's planogram, while using a portable shopper device having a location sensing means and an RFID reader in conjunction with RFID shelf labels, is provided for. In part, the method provides a system and steps associated with collecting RFID product label information and comparing collected information with product information in relation to an initial planogram, via a software means. Once differences are identified, an updated planogram may be created for the retailer's use using the system and method of the present invention.

20 Claims, 1 Drawing Sheet

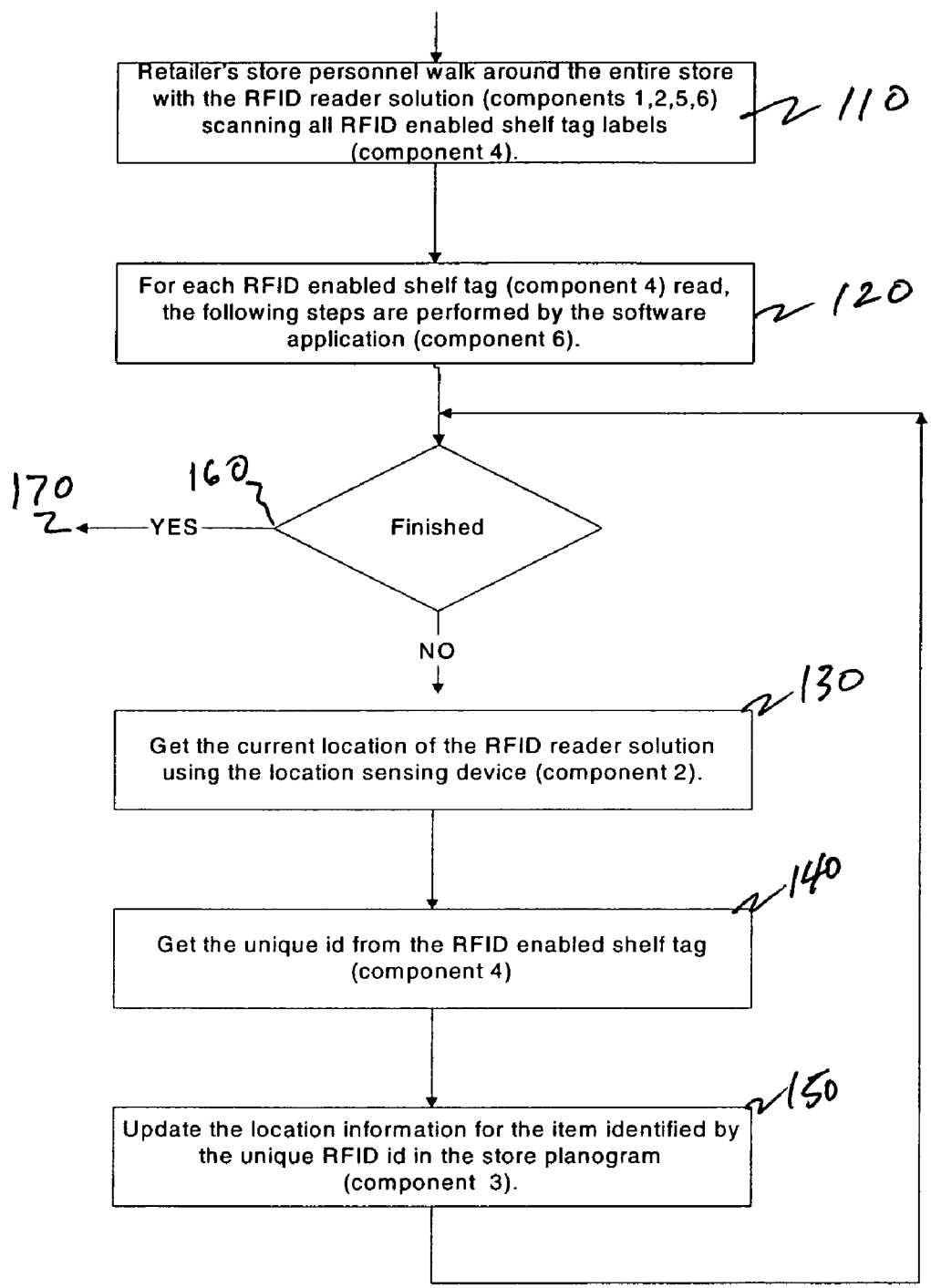
FIGURE ONE

SYSTEM AND METHOD OF UPDATING PLANOGRAM INFORMATION USING RFID TAGS AND PERSONAL SHOPPING DEVICE

BACKGROUND OF THE INVENTION

1. Field of the Invention

The present invention relates generally to retailing devices and apparatuses therein, and, more particularly, to the use of radio frequency identification (RFID) enabled shelf tags and a wireless portable personal shopper which are used to manage a database that describes the location of all items in a store.

2. Description of Related Art

It is known that in retailing, portable shopper devices and applications are an emerging and popular technology. Portable shopper devices (also known as portable shoppers) use wireless technology, touch screen displays, include computer processing capabilities, and may also include scanning devices suited to scan labels of items offered for sale. These portable shoppers are generally situated and arranged on mobile equipment (such as carts or in a hand-held form) so as to permit consumers the ability to scan their selected items as they shop while providing those consumers the ability to thereafter complete the transaction by quickly proceeding through the checkout lane. Certain portable shoppers provide consumers the ability to also checkout from their devices by further including a swipe type of device (such as a magnetic card stripe reader (MSR) suited for a credit card).

In many cases, retailers are also including upgraded software applications (e.g., shopping list, deli ordering, product information, product locator) which provide consumers further options while shopping. While consumers are finding these portable shoppers to be convenient in use, retailers are realizing that consumers may elect to shop at a particular grocer due to this convenience and the shortened time in which the consumer may encounter throughout the entire collection and checkout process takes. This latter aspect is particularly enticing to consumers and retailers alike, as in the checkout lane there is no need to re-scan the collected items in the cart as the items in the cart have already been scanned by the consumer prior to placement in the cart.

As becomes obvious, the retailer directly benefits from this time saving feature as the retailer realizes reduced labor costs due to the expedited checkout process and can consider further advertisement or incentivized communication with the consumer during the collection portion of the consumer's time spent shopping.

However these portable shoppers, though convenient and economically well-suited, pose retailers with a variety of concerns, including that of utilization in relation to a planogram of the store (wherein a planogram is how a retailer's configure a layout of their respective stores) so as how to associate the location of the device (and hence the consumer) in relation to the location of products of interest to the consumer so as to promote certain products to a customer based on their proximity to those goods; this utililization is particularly important as retailers desire to offer consumers a "scan as you shop" type of approach. Until now, the development of planograms has been a largely manual, time-consuming process, and the use of portable shopper devices to assist retailers in developing accurate planograms has not been explored.

SUMMARY OF THE INVENTION

Thus, the need persists for a method and system that assists in the timely and accurate development and updating of planograms in a retail environment while using a portable shopper device that utilizes product location information. The present invention overcomes the above-identified unresolved problems and deficiencies and sets forth additional advantageous attributes as further detailed in the manner described hereinbelow.

The present invention sets forth the method for updating and verifying the accuracy of a retailer's planogram comprising the steps of reading an electronic transmission from at least one RFID tag in a retail environment located in proximity to a product, using a personal shopper device having a location sensing mechanism, a memory, a software means, and an RFID reader, wherein an initial planogram is stored therein, collecting said read electronic location information transmitted from said at least one RFID tag by said shopper device, analyzing and comparing said collected location information by said software means of said shopper device, with said initial planogram in relation to initial location information of said product with collected location information for said product from said collected information, updating said initial location information for said product in said initial planogram in response to collected location information to provide an updated planogram to display current location information for said product in a current planogram arrangement in said retail environment.

The present invention is a planogram updating system comprising a portable shopper device having a location sensing means, a software means and an RFID reader, a retail system comprising a database in communication with said shopper device, an initial planogram stored in said database, and one or more product RFID shelf labels positioned in a retail environment, wherein said RFID reader is capable of reading an electronic transmission from at least said one or more RFID shelf labels using said personal shopper device and transmitting collected read electronic information to said database, wherein said initial planogram is updated in response to collected read electronic information by said software means and said database is updated with a current planogram reflecting said collected read electronic information.

BRIEF DESCRIPTION OF THE DRAWINGS

Other aspects, features, and advantages of the present invention will become more fully apparent from the following detailed description, the appended claims, and the accompanying drawings in which:

FIG. 1 is a flowchart of a preferred method of the present invention for updating product location information in a planogram.

DETAILED DESCRIPTION

The use of figure reference labels in the claims is intended to identify one or more possible embodiments of the claimed subject matter in order to facilitate the interpretation of the claims. Such labeling is not to be construed as necessarily limiting the scope of those claims to the embodiments shown in the corresponding figures. The preferred embodiments of the present invention and its advantages are best understood by referring to the drawings, like numerals being used for like and corresponding parts of the various drawings. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

A planogram updating system of the present invention comprises a retail system, a portable shopper device having a location sensing means and an RFID reader, and one or more product RFID shelf labels positioned in the retail environment.

A retail system as used herein typically comprises a server and a database having product information and storage to collect information received from said portable shopper device. Preferably a retail system would also include check-out stations (also used as point of sale devices (POS)), each consisting of a scanner and a terminal comprising till (cash register), display, printer, card reader, and electronic tag deactivation sensor, each of which is in communication with the database containing product information. In operation, in the preferred retail system, the scanner operates by detecting conventional bar codes, printed on purchased items, and passes these to a main server computer across the retailer's network which is in communication with a database storing bar codes, prices and product names. The database also stores, via table or relational association, which products are designated as having an electronic tag. Prices, electronic tags and product names corresponding to the bar codes are identified and fed back to the terminal for display to the checkout operator and customer when these products undergo a formal checkout process. The server, or possibly, the terminal itself lists all the items purchased and calculates the total price to be paid. The printer of the POS typically prints the till receipt for the customer in conventional manner.

A portable shopper device comprises computer-based processing means, a display, a scanner, a memory, and a location sensing means. In a preferred embodiment, the location sensing means may include a location tracking system such as that involving a GPS type of sensing system, a location sensing mechanism capable of identifying the location of the shopper device and transmitting the location information to networked server in the retail environment, a location sensing device capable of receiving electronic location information transmitted from an electronic label such as an RFID shelf label (i.e., an RFID reader), or a location sensing device that is able to interpret known reference location points within the physical retail environment and determine the coordinate point of reference for where the shopper device is located within the retail environment. In certain of these contexts, it is envisioned that the location means is also able to engage in wireless communication with a server of the retail environment to transmit location information of the shopper device at a predetermined rate, such that the retailer is in essence able to track the consumer and trigger product alerts to the consumer based upon the consumer's location in proximity to certain products being highlighted by the retailer. Additionally, based upon the product promotion listing held by the retailer (resident within the shopper device or within the retail system), triggering information may be communicated to shelf labels or advertisement labels, associated with certain products located at specific points within the retail environment, such that a consumer is informed of a promotion at the consumer approaches certain predetermined products.

Preferably, the shopper device also comprises an activation trigger and a keypad, though such are not necessary. In a preferred embodiment, the activation means may be a swipe card mag strip or similar so a consumer may activate a hand held portable shopper device by swiping their loyalty card and thereby activating the device while communicating their presence with the retail system server. One aspect of this system is the maintenance and updating of a "customer shopping profile" in a memory of the hand-held device. A "purchase record" containing item names, quantities and numeric codes may be built up during shopping and used to facilitate checkout and also as a basis for updating the contents of the profile memory.

In operation, in a preferred aspect, the shopper device would also transmit location information of the shopper's location (based on the location of the shopper device) to the server of the retail system. In part, as the consumer reviews items and perhaps places items in their cart, a signal is sent from the shopper device to the server indicating location of the consumer. At certain times, this location transmission may be concurrent with the transmission of a request for assistance, or scanned product information from the shopper device to the server. Further the shopper device may also detect the electronic transmission of an RFID shelf label and communicate receipt of such information to the retail system.

A further part of the retail system includes at least one or more product RFID shelf tags (i.e., shelf labels capable of emitting electronic signals) placed in relation to the products they identify. While presently retailers employ information labels on the shelves to identify information (e.g., price, price per unit weight) for the product on the shelf, these basic labels are unable to engage in electronic communication. The present invention adds RFID tags to these labels and for each shelf label the RFID tag contains a unique identifier which can be read with an RFID reader. The RFID shelf labels may also have a location sensing device similar to that described previously such that the RFID label may be able to detect the presence of the shopper device, or the removal of an product having an electronic label and communicate receipt of such information back to the retail system. In a preferred aspect of the present invention, a retail environment comprises product shelf labels that are all RFID product shelf labels.

FIG. 1 is a flowchart of a preferred method wherein the retail staff walk around the store with a personal shopper device having an RFID reader wherein the retail staff scan all the RFID shelf labels in the retail environment (110); as each RFID label is scanned by the personnel using the RFID reader, the software means acts to collect the scanned information and analyze the collected information (120); the read RFID information includes the current location of the RFID reader using the location sensing device (130); the software means is able to then identify the unique identifier transmitted by the RFID shelf label (via the read RFID information) (140); and the location information of the item identified by the read RFID information is compared with the prior location information of the requisite item, and updated if there is a difference (150); once all RFID labels have been read, in effect the software means has updated the planogram (160) such that an updated planogram is available to the retailer for further use (170). Thereafter, the updated planogram information may be used as the initial planogram in which additional collected information may be compared with for the next time the store personnel elect to update their planogram.

In another aspect, a consumer's actions may in effect assist in updating the planogram by the present invention as well. Once information is received by the retail system, be it from the RFID label location means or shopper device location means (e.g., the RFID reader on the device) operated by either store personnel or a consumer, the database (either located in the personal shopper device or the retail system) collects the received information and compares the received information to the initial planogram information resident. If there is an discrepancy or difference between the initial information of the planogram and that received, the planogram is updated to reflect the most recent information, and the updated planogram is stored in the database for future comparison with future information collected.

As used herein, the term shopper and consumer is not intended to limit the invention to use only by purchasers, but rather is used to simply exemplify a particular implementation; as used herein, the terms shopper, consumer, retailer, retail staff and grocer are intended to be used interchangeable It is also envisioned that the present invention could be used to create a partial update of a planogram or a routine update of a planogram in a retail environment.

Although an embodiment of the present invention is described above, the present invention is not limited to the above embodiment, and it is understood by those skilled in the art that other configuration(s) in view of the invention are also possible. In general, the present invention may be implemented for retailers, grocers, and even discount centers having products that are identifiable by a scannable label, however, the present invention is not intended to be limited to only these implementations.

It will be further understood that various changes in the details, materials, and arrangements of the parts which have been described and illustrated in order to explain the nature of this invention may be made by those skilled in the art without departing from the principle and scope of the invention as expressed in the following claims. Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A method for updating a retail planogram comprising the steps of:
   reading an electronic location information transmitted from at least one RFID tag in a retail environment located in proximity to a product, using a personal shopper device having a location sensing mechanism, a memory, a software means, and an RFID reader, wherein an initial planogram is stored therein,
   collecting said read electronic location information transmitted from said at least one RFID tag by said shopper device,
   analyzing and comparing said collected location information by said software means of said shopper device, with said initial planogram in relation to initial location information of said product with collected location information for said product from said collected information,
   updating said initial location information for said product in said initial planogram in response to collected location information to provide an updated planogram to display current location information for said product in a current planogram arrangement in said retail environment.

2. The method of claim 1, wherein said device is fixedly mounted to a shopping cart.

3. The method of claim 1, wherein said RFID tag is an RFID shelf tag.

4. The method of claim 3 wherein said method further comprises the step of transmitting said analyzed information to a retail server wherein a database map of product locations is generated in relation to their respective RFID shelf tags.

5. The method of claim 4, wherein said read electronic location information includes unique product identifiers and unique location identifiers indicating unique information about products in said retail environment.

6. The method of claim 3. wherein said method is performed by a consumer.

7. The method of claim 3, wherein said method is performed by a retailer.

8. The method of claim 3, wherein all product labels in said retail environment are RFID shelf tags.

9. Th. method of claim 3, further comprising the step of generating an updated planogram.

10. A system for updating a planogram comprising:
    a personal shopper device having a location sensing means, a software means and an RFID reader,
    a retail system comprising a database in communication with said shopper device,
    an initial planogram stored in said database, and
    one or more product RFID shelf labels positioned in a retail environment,
    wherein said RFID reader is capable of reading an electronic information transmitted from at least said one or more RFID shelf labels using said personal shopper device and transmitting collected read electronic information to said database, wherein said initial planogram is updated in response to collected read electronic information by said software means and said database is updated with a current planogram reflecting said collected read electronic information.

11. The system of claim 10, wherein said software means is software that compares initial product location information with collected product location information and identifies differences therebetween.

12. The system of claim 11, wherein said location sensing means reads coordinates from known location points within said retail environment to determine a coordinate location point of said shopper device at an instant of time.

13. The system of claim 11, wherein said shopper device is a hand-held device having a display in wireless communication with said retail system.

14. The system of claim 11, wherein said RFID shelf label further comprises visible product information including per unit price.

15. The system of claim 11, wherein said RFID shelf label transmits electronic information including unique product identifiers and unique location identifiers indicating unique information to said RFID reader.

16. The system of claim 11, wherein all product labels in said retail environment are RFID shelf tags.

17. The system of claim 11. further comprising a display for displaying an updated planogram.

18. The system of claim 11, further comprising a printer for printing an updated planogram.

19. A system for generating an updated planogram in a retail environment comprising:
    a personal shopper device having a location sensor, comparative software and an RFID reader,
    a retail system comprising a server,
    a database in communication with said shopper device,
    a wireless communication network,
    an initial planogram stored in said database, and
    a plurality of product RFID shelf labels positioned in proximity to each of their respective products, wherein said RFID reader reads product location information electronically transmitted from at least one of said plurality of product RFID shelf labels using said personal shopper device and said comparative software compares initial product location information of said initial planogram with said read product location information and updates said initial planogram in response to said read product location information and said database is updated with a current planogram in relation to said read product location information.

20. The system of claim 19, wherein said database stores said initial planogram and said current planogram concurrently.

* * * * *